No. 867,137. PATENTED SEPT. 24, 1907.
J. P. KARR & J. D. RAUCH.
CLUTCH OPERATING MECHANISM.
APPLICATION FILED FEB. 12, 1907.
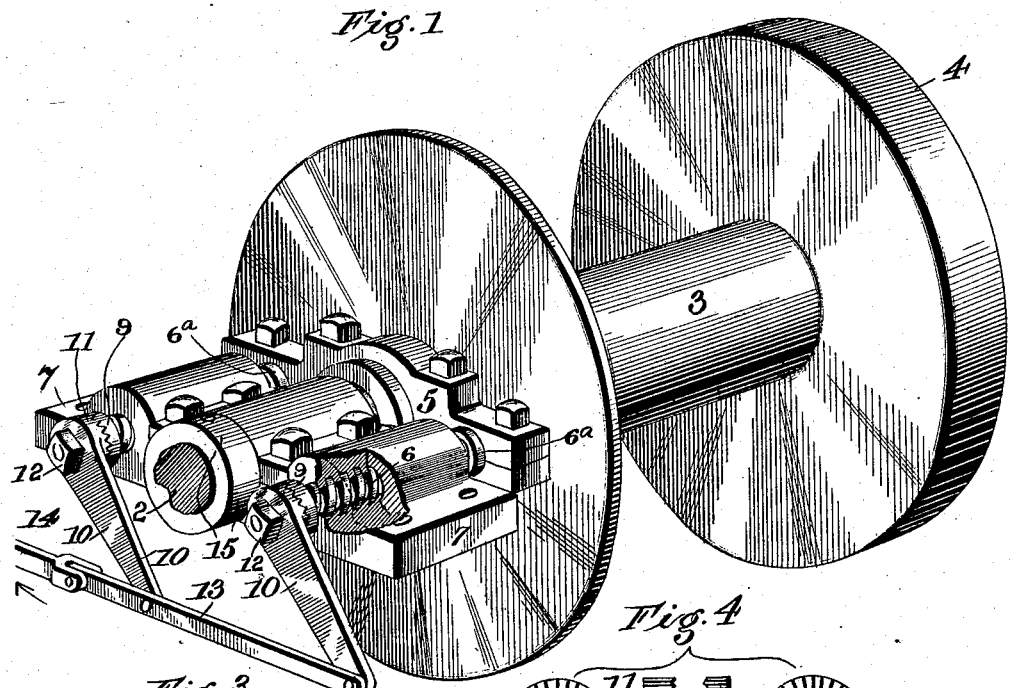
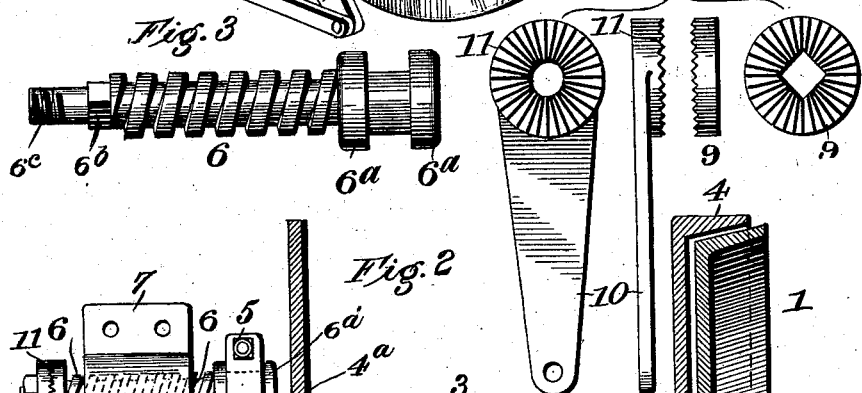
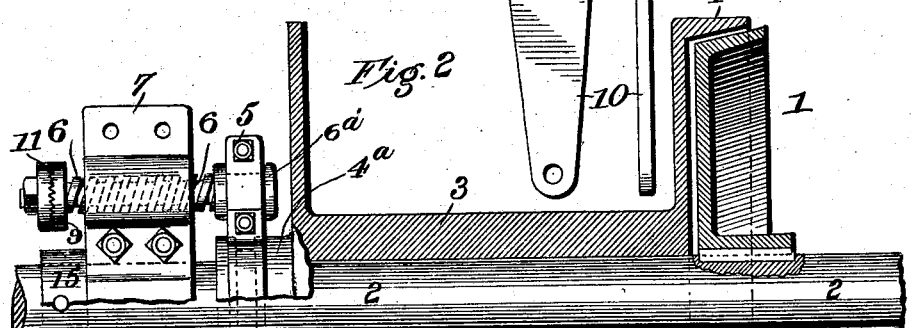
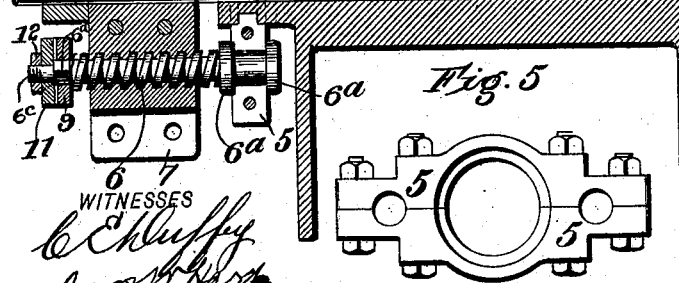
WITNESSES
INVENTORS
JAMES P. KARR
JOHN D. RAUCH
BY
ATTORNEYS

UNITED STATES PATENT OFFICE.

JAMES P. KARR AND JOHN D. RAUCH, OF LOGANSPORT, INDIANA.

CLUTCH-OPERATING MECHANISM.

No. 867,137.  Specification of Letters Patent.  Patented Sept. 24, 1907.

Application filed February 12, 1907. Serial No. 357,017.

*To all whom it may concern:*

Be it known that we, JAMES P. KARR and JOHN D. RAUCH, citizens of the United States, and residents of Logansport, in the county of Cass and State of Indiana, have invented an Improved Clutch-Operating Mechanism, of which the following is a specification.

The object of our invention is to provide an improved means or mechanism for operating friction clutches such as are used with the drums of hoisting machines and the like.

It is common to employ single screws for engaging friction cones constituting clutch members, and springs and counter-balances are ordinarily used for their disengagement. It frequently happens that the clutch members stick or adhere to each other and with such force that they are not readily separated, and hence the drum of the hoisting mechanism continues to revolve, which may result in breakage of some portion of the machinery, or in personal injury, or even loss of life. Double or twin screws have been employed with a view to avoid such results, and our invention is an improvement in this particular line or class of clutch mechanism.

We have produced a mechanism in which the construction is simplified, friction in adjusting the movable clutch members is reduced, and the separation of the clutch members may be effected instantly under all conditions. We have also provided for varying the throw and rotation of the twin screws as may be required to take up wear.

The details of construction, arrangement, and combination of parts are as hereinafter described and shown in the accompanying drawings, in which Figure 1 is a perspective view of a hoisting drum and our improved mechanism applied thereto, a portion being broken away to show the interior construction. Fig. 2 is mainly a longitudinal horizontal section of the drum, other parts being shown in both plan and section. Fig. 3 is a side view of one of the screws employed for adjusting the movable clutch member. Fig. 4 is a view showing portions of the clutch-operating mechanism disassociated. Fig. 5 is a face view of a yoke applied to the hoisting drum.

As shown in Fig. 2, a friction cone or clutch member 1 is keyed upon the shaft 2, and a drum 3, having a concave, "cone", or clutch, member 4 is mounted slidably and loose on the shaft 2. The friction members are constructed in a well known manner and require no special description. It will be understood that when the drum 3 is adjusted to the right, the cones or friction clutches 1—4 engage and lock firmly so that the drum will be rotated along with the member 1 and shaft 2; and, contrariwise, when the drum is adjusted to the left, the parts 1—4 will be disengaged and the drum left free to rotate upon the shaft. The left hand end of the drum 3 is provided with a hub $4^a$ having a circumferential groove—as shown in Fig. 2—the yoke 5 is applied to this hub and arranged in horizontal position, and screw-shafts 6 are connected with the opposite ends of the yoke and pass through threaded bores in the pillow block 7. The yoke is constructed in halves, or two like separable portions—as shown in Fig. 5—the same being secured together by screw bolts.

As shown in Figs. 2 and 3, the heads or inner ends of the screw-shafts 6 are provided with collars $6^a$ which are spaced apart to receive the end portions of the yoke 5. The outer ends of the screw-shafts 6 have each a polygonal portion $6^b$ and a reduced screw-threaded portion $6^c$.

Upon the polygonal portion 7 we apply a clutch collar 9—see Figs. 1, 2, 4—and the face or outer side of the same is provided with radial teeth.

A lever 10 having an enlarged head 11 provided with a correspondingly toothed face is applied to the reduced threaded end of the screw-shafts 6, and nuts 12 are applied to the parts $6^c$ for clamping the heads 11 of levers 10 to the toothed collars 9. The lower ends of the levers 10 are connected by a rod 13 so that both move together and have an equal throw, and an operating rod 14 is connected with the rod 13—as shown. It will now be apparent that if the rod 14 be pulled in the direction of the arrow, the levers 10 will be swung to the left and the screw-shafts 6 thereby rotated and advanced inward, thus carrying the yoke 5 with them and consequently forcing the drum 3 to the right and bringing the clutch members 1 and 4 into firm engagement. On the other hand, by swinging the levers 10 back to the position indicated in Fig. 1 the drum will be drawn outwardly, thus instantly releasing the engagement of the clutch members 1—4. Thus, by the simplest arrangement of the screw-shafts and their engagement with the drum by means of the yoke 5, the drum may be slid on the shaft without binding on one side more than the other, and the two clutch members thus engage equally around their entire periphery; and when the screw shafts are operated in the opposite direction, the drum will be drawn away from the fixed friction member 1 and thus instantly released so as to revolve free.

It is apparent that by shifting the levers 10 on the screw-threaded ends of the shafts 6, their throw may be increased and thereby the movement of the screw-shafts both rotatably and longitudinally will be increased correspondingly, so that the drum 3 may be moved farther to the right by the same throw or longitudinal movement of the connecting rods 13—14. In other words, by adjustment of the levers 10 as described, we provide for easily and quickly taking up wear of the clutch members so that a firm and secure engagement is always assured.

What we claim is:

1. The combination, with a rotatable shaft a fixed pillow block and a friction clutch member fixed on the shaft, and a drum which is loose on the shaft and provided at one end with a friction member and at the other with a hub having a circumferential groove, of a yoke applied to the grooved hub and composed of separable parts, screw-shafts having heads provided with collars spaced apart and adapted for connection with the yoke, the said shafts passing through threaded bores in the pillow block and their outer ends provided with polygonal, cylindrical and threaded portions, toothed collars applied to such polygonal portions, levers having toothed heads adapted to engage the said collars and mounted on the cylindrical portions of the screw-shafts, nuts clamping the toothed parts together, and a rod connecting the levers and serving for adjusting them, substantially as described.

2. The combination, with a fixed pillow block, rotatable shaft and cone members, of a yoke connected with one of said members, screw-shafts engaging the yoke rotatably and passing through threaded bores in the pillow block, said shafts having polygonal and threaded end portions, toothed collars applied to such portions one of them having an extended arm constituting a lever, nuts applied to the screw-shafts for clamping the toothed parts together, and means for connecting the levers, substantially as described.

JAMES P. KARR.
JOHN D. RAUCH.

Witnesses:
FRANK P. WILKINSON,
HARRY C. KESLING.